United States Patent [19]

Benton et al.

[11] Patent Number: 4,599,832
[45] Date of Patent: Jul. 15, 1986

[54] EXTENDIBLE STRUCTURES

[76] Inventors: Max D. Benton, 175 Salisbury; William M. Robbins, Jr., 1540 Holliday Hill Rd., both of Goleta, Calif. 93117

[21] Appl. No.: 688,795
[22] Filed: Jan. 4, 1985
[51] Int. Cl.$^4$ .................. E04H 12/18; E04H 12/34
[52] U.S. Cl. ..................................... 52/118; 52/632; 52/645; 52/646; 5/99 R
[58] Field of Search ............... 5/99 A, 99 C, 99 R; 52/118, 121, 108, 109, 645, 646, 632

[56] References Cited

U.S. PATENT DOCUMENTS

| 643,822 | 2/1900 | Isham | 5/99 A |
| 651,773 | 6/1900 | Smith | 5/99 R |
| 3,593,481 | 7/1971 | Mikulin | 52/121 |
| 3,751,863 | 8/1973 | Lyons | 52/645 |
| 4,480,415 | 11/1984 | Truss | 52/121 |

FOREIGN PATENT DOCUMENTS 2117196 11/1972 Fed. Rep. of Germany.

Primary Examiner—James L. Ridgill, Jr.
Attorney, Agent, or Firm—Donald D. Mon

[57] ABSTRACT

An extendible structure that can be collapsed to a shorter length and extended to a longer length. A pair of station members are interconnected by at least three longeron members. Each longeron member has two longeron elements that are pivoted together so they can fold toward one another or aligned to form a column. Each element is pivoted to a respective station member. Stays rigidify the structure when extended, and are opposed by buckling springs (Euler columns) that exert an outward resultant force on each longeron member at its folding point.

25 Claims, 7 Drawing Figures

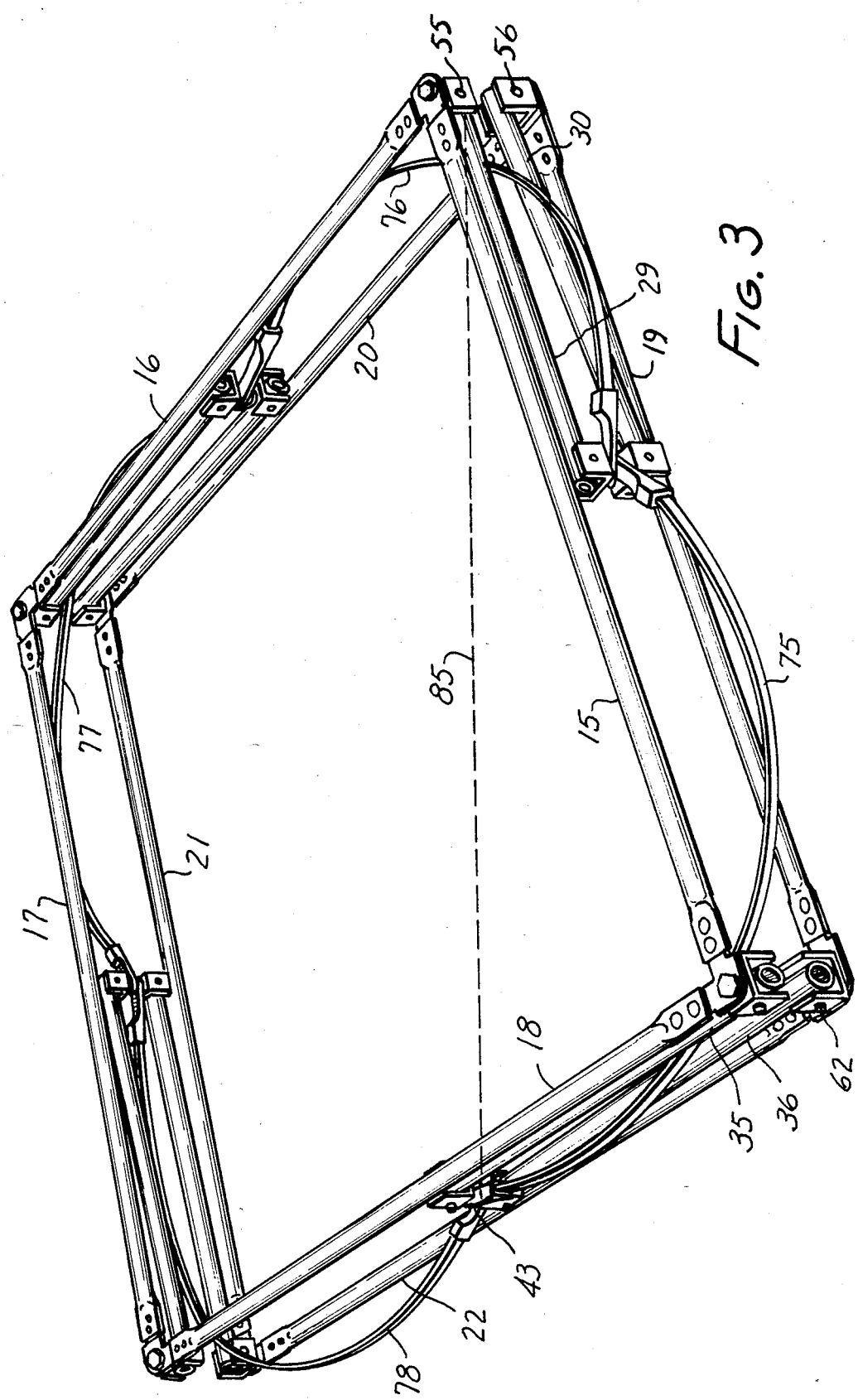

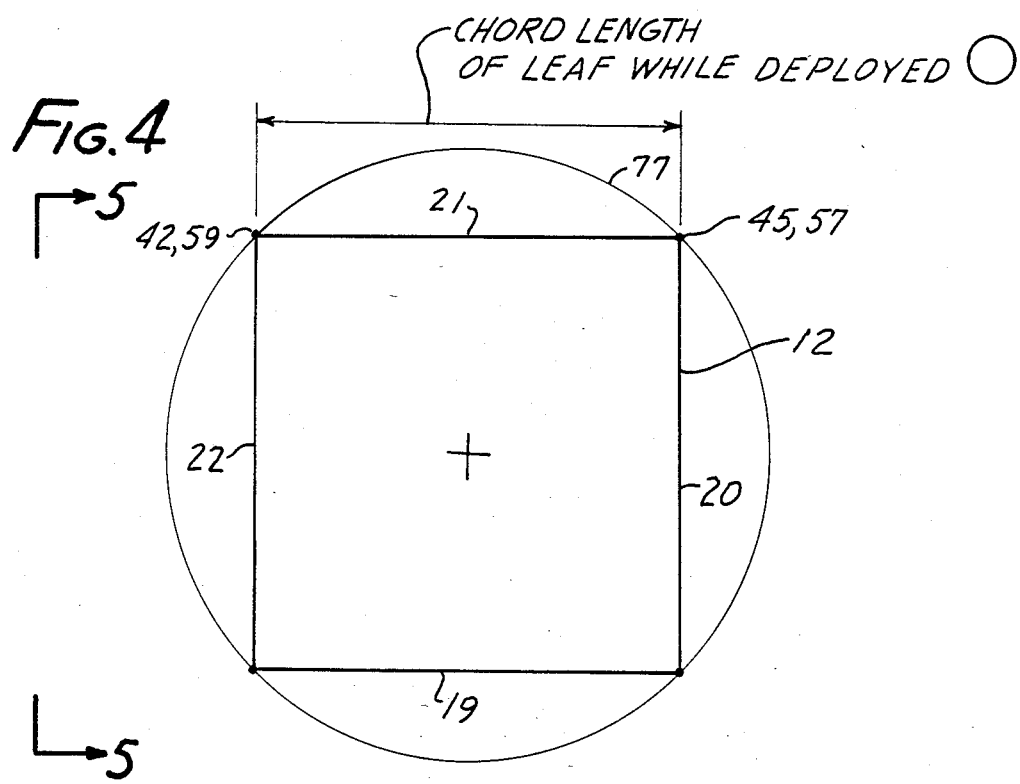
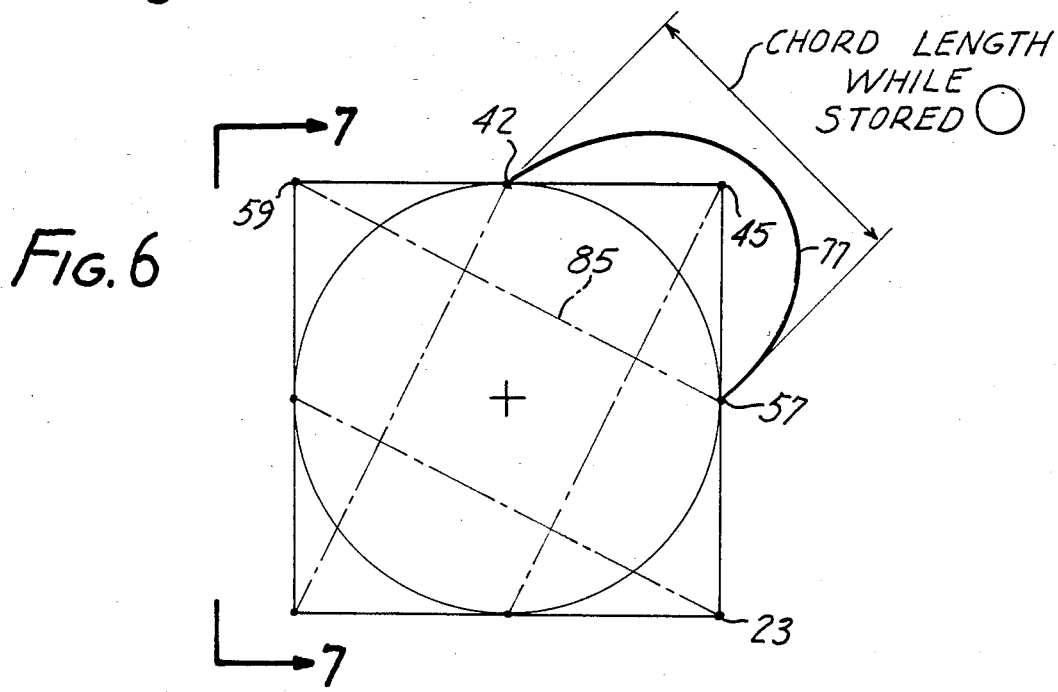
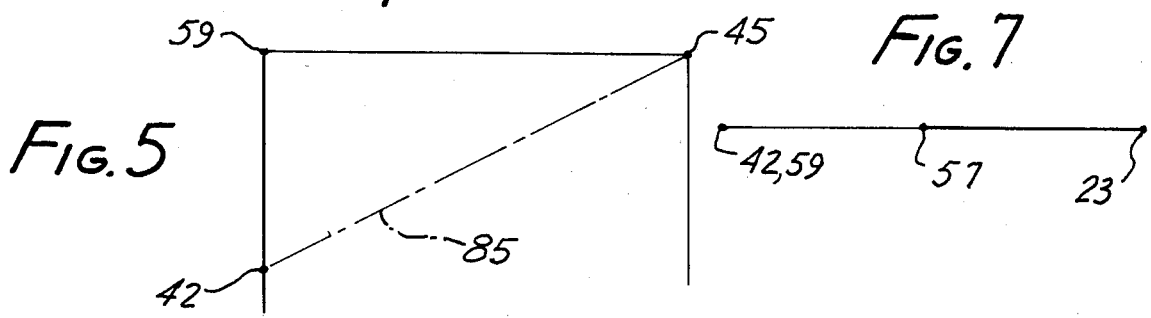

EXTENDIBLE STRUCTURES

FIELD OF THE INVENTION

This invention relates to extendible structures, for example booms and towers that can be stored at lesser lengths and extended to greater lengths.

BACKGROUND OF THE INVENTION

Extendible structures are extensively used as portable towers and booms. They are collapsible to be stored in envelopes of lesser height or length, and can be extended (deployed, erected) to a greater height or length. Such structures most frequently require cables or other axially-operated systems to extend them to their full length, and locking means to hold them in their extended condition. Especially for airborne and space vehicles, where such structures find frequent employment, these are not only additional complications subject to malfunction, but represent undesirable weight. For land-based use, such as for towers to support antennae, they represent undesirable ground weight and resistance to the wind.

It is an object of this invention to provide an extendible structure which is inherently biased towards its extended configuration, and which requires no locking elements to hold it extended.

Furthermore, the integrity of such structures when damaged or disabled is a serious matter, especially when the structure is deployed where it can be repaired only with difficulty, or where it may not be repairable at all.

It is an object of this invention to provide an extendible structure which can be damaged or fractured to a substantial extent, and still retain substantial integrity.

BRIEF DESCRIPTION OF THE INVENTION

An extendible structure according to this invention has an axis of extension. The structure comprises a plurality of axially spaced-apart station members, each of which is rigid, and which lies in a plane normal to said axis. At least three longeron members, each comprising two rigid longeron elements join adjacent station members together. First joint means join first ends of the elements of each pair to one another for foldable movement relative to each other, and second joint means join the second ends of said longeron elements to respective station members for foldable movement relative to said station member.

A buckling spring which buckles springily under end load compression exerts an endwise expansive force adjacent first longeron joints, whereby to bias said joints away from each other, with a resultant force on each first joint means directed outwardly away from said axis. The station members and longeron members, when all joint means respective to each pair of joined longeron elements are aligned, form a respective side panel.

A pair of first stay members, and a pair of second stay members for each said panel, have respective maximum lengths when fully stretched by tension forces. Each of the first stay members extends from a respective second joint means of one longeron member to the first joint means of an adjacent longeron member, converging in the direction of folding of said longeron elements. Each of the second stay members extends from a respective second joint means of the said adjacent longeron member to the first joint means of said first mentioned longeron member. At least the second stay members are non-rigid in compression. All stay members have maximum length when fully stretched by tension forces.

According to a preferred but optional feature of the invention, the assembly can be elongated by using the top station member of one structure for the lower station of the next structure.

According to still another preferred but optional feature of the invention, all stay members may be chains, cables or otherwise flexible members.

The above and other features of this invention will be fully understood from the following detailed description and the accompanying drawings, in which:

BRIEF DESCRIPTION OF THE DRAWINGS

FIG. 3 is a perspective view of the structure of FIG. 1 fully collapsed;

FIG. 4 is a top schematic view showing the basic geometry of the structure when fully extended;

FIG. 5 is a side schematic view taken at line 5—5 in FIG. 4;

FIG. 6 is a top schematic view showing the basic geometry of the fully collapsed structure; and FIG. 7 is a side schematic view taken at line 7—7 in FIG. 6.

DETAILED DESCRIPTION OF THE INVENTION

Figure 1:
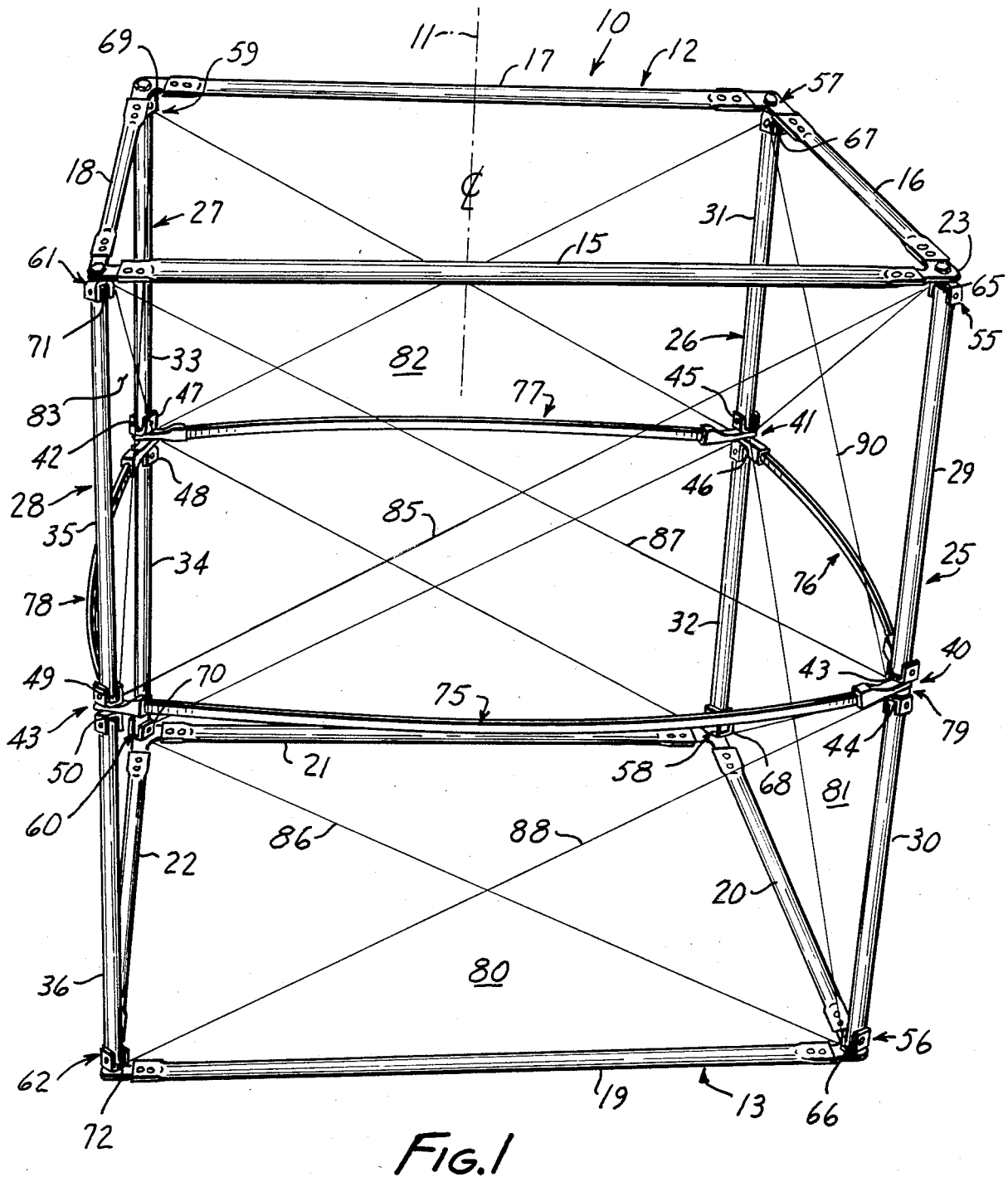
FIG. 1 is a perspective view showing the presently preferred embodiment of the invention fully extended.

The presently preferred embodiment of the invention is shown in its fully extended condition in FIG. 1. In this figure an extendible structure 10 is shown which has an axis of extension 11. It has a first station member 12 and a second station member 13. These station members are rigid and they preferably comprise a rod-like framework. They could instead be solid bulkhead members if preferred. But because this device will generally be used where lightness is a preferred feature, rod-like elements will generally be used. The term "rod-like" is used generically to describe linearly extending objects such as rods, tubes, L-shaped angles, and the like.

Station member 12 has elements 15, 16, 17, 18 and station member 13 has elements 19, 20, 21 and 22. These are joined at their corners by fastening means in a quadrilateral array. They may be directly attached to one another or can be attached to one another by corner brackets of which bracket 23 is a characteristic example. In any event, the resulting structure will be a polygon. In the illustrated embodiment the polygon is a rectangular quadrilateral. It is equally possible for there to be three-sided structures or for the station members to have different shapes. As far as the collapsable and extendible feature is concerned, the section is determined by apices as defined by the intersection with the station members of a plurality of longeron members 25, 26, 27 and 28.

Longeron member 25 is comprised of a pair of longeron elements 29 and 30. Longeron member 26 is comprised of a pair of longeron elements 31 and 32. Longeron member 27 is comprised of a pair of longeron elements 33 and 34. Longeron member 28 is comprised of a pair of longeron elements 35 and 36.

The pairs of longeron elements of longeron members 25–28 are jointed together at and by first joint means 40, 41, 42 and 43 respectively. These joint means join the first ends of the longeron elements in pairs relative to longeron members 25-28 as follows: 43, 44; 45, 46; 47, 48; 49, 50.

The first joint means enable the pairs of longeron elements to pivot relative to one another so that they can fold toward one another.

Each longeron member also has a pair of second joint means as follows. As to longeron members 25, 26, 27, 28; the second joint means are as follows: 55, 56; 57, 58; 59, 60; 61, 62. The second joint means connect the second ends of the longeron elements to respective station members. The second ends relative to longeron members 25, 26, 27 and 28 are as follows: 65, 66, 67, 68, 69, 70, 71, 72.

Four buckling springs 75, 76, 77, 78 extend respectively between adjacent first joint means. These buckling springs buckle resiliently under end load compression, behaving as an Euler column. They are connected to and extend between each pair of adjacent first joint means and bias the first joint means away from each other and thereby also provide a resultant force on each first joint means directed outwardly away from the axis of extension.

The material of which the buckling springs are made will be determined by the forces which it must exert, and the environment to which it will be exposed. For atmospheric and space applications, fiberglass epoxy constructions are quite suitable. For example, laid-down fiberglass fibers along the length of the buckling spring in an epoxy matrix is a very suitable material. The ends of each of the springs are fitted with eyelets of which a typical eyelet 79 is shown. These are spindled to a post (not shown) that may or may not form part of the first joint means, and which enables the exertion of the resultant forces on the longeron members. In the fully extended condition, the buckling springs will still be somewhat flexed so as to continue to exert the resultant force described.

While the first joint means are shown comprised of two separate hinges, and means for attaching the springs, it is emphasized that only a single hinge is needed between them. Furthermore, the relative rotation of the spring end relative to the first joint is not necessary, because the strains can be accommodated by the springiness of the spring material. However most frequently the spring ends will be attached rotatably as shown. The two hinges shown for the first joints are treated herein as a single hinge action around the center of the joint means. Also, the springs need not exert their forces precisely on the axis of the longeron elements. Instead, attachment means may be attached radially displaced inboard or outboard thereof.

The buckling spring is preferably a flat blade construction in cross-section and longitudinal shape, although it may have any other desired cross-section and characteristic which the designer might wish to use, so long as when buckled it exerts an endwise force as illustrated when the construction is extended, and which can be additionally buckled resiliently, remaining able to exert an extending force between its two ends.

When all joint means respective to each longeron member are aligned, they, together with the station members form a respective rectangular side panel. There are four of these side panels 80, 81, 82 and 83. If there were other than four longeron members (there must be at least three), the panels would still be rectangular, but there would be a number of them equal to the number of longeron members.

All of the panels are identical, so that only one of them will be described in detail and this will be panel 80. A pair of first stay members 85, 86 extends between first joint means 43 and second joint means 55 and 56. They converge toward the first joint means 43 which as it transpires will be the leading joint means in folding, as will later be described. A pair of second stay members 87, 88 extends from first joint means 40 to second joint means 61, 62 and converge toward first joint means 40.

All stay members have a maximum length when fully stretched by tension forces whereby to limit the separation of their ends. Conveniently they may be made as chains or cables or some other flexible type of device. The first stay members may if desired be rigid instead of flexible, because in the operation of this device the distance between their two ends will not change. The second stay members, however, must allow the distance between their two ends to change. Such a result is most conveniently accomplished by the use of flexible devices such as chains or cables. However telescopic arrangements or even spring-like arrangements are also useful. When the device changes its configuration the spacing between the "trailing joint means" in this case joint means 40 and the second joint means to which it is attached will change.

These stay means will be repeated for each one of the panels, and like numbers are used when they are referred to.

The device shown in the drawings is a demonstration device intended to show maximum flexibility in design and construction. As shown, the joint means all have at least one degree of rotational freedom, i.e., that of their hinge pin which enables the swinging action to occur between the longeron elements and their next assembly. In this device, a second degree of rotational freedom is also shown which is normal to the station elements and which enables rotation of the joint means to occur.

However this is not a necessary feature because the folding action of the longeron members will occur in a single plane as will be described. However there may be some constructions in which the rotation of the longeron element or some other joint means would be desirable. If not, then the hinges will be fixed, with the axes of the three hinges respective to each longeron member parallel to one another, and normal to the plane in which the folding action occurs. It is desirable for the eyelets adjoining the buckling springs to enable relative angular movement of the springs to occur, and this is provided for by passing pin members as part of the joint means through the eyelets to join the buckling springs to the longeron members.

While the device has been shown four sided, triangular structures are equally useful and also other polygons of other numbers can be manufactured.

It should also be understood that the device can be multiplied in the axial direction by duplicating the already described structure using the upper station member as the lower station member of the next assembly.

The structure can also be multiplied laterally by coupling two or more structures together by fastener or bracket means. In this case, however, each of the lateral devices must in itself be complete as shown. It cannot share parts with its neighbor.

Figure 2:
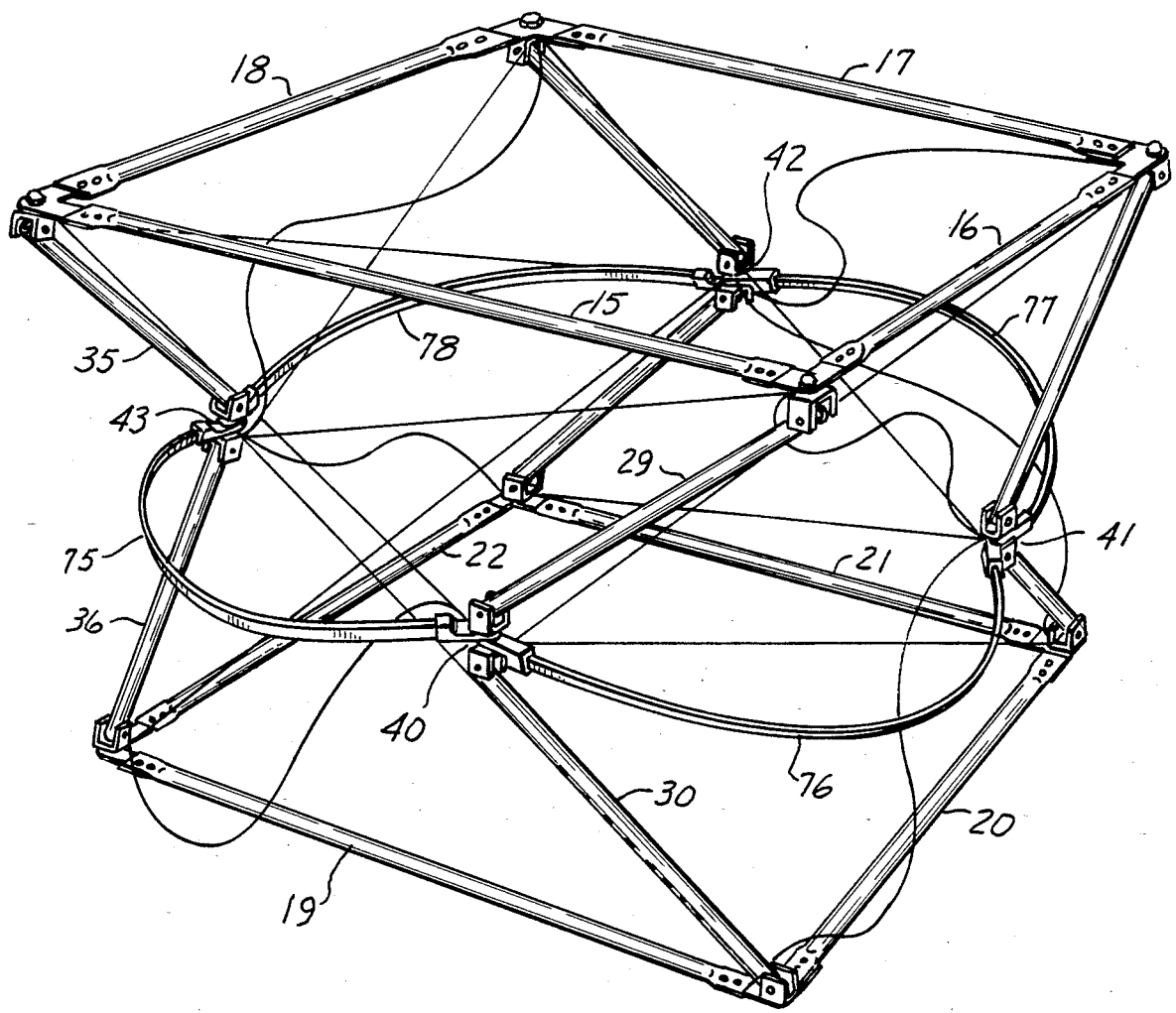
FIG. 2 is a perspective view of the structure of FIG. 1 partly collapsed.

The operation of the device will be evident from FIGS. 1-3. FIG. 1 shows the device fully extended with its shape fully defined by the stay members, which are all drawn taut. Under these circumstances, the longerons can be in no position other than the aligned one where their respective three joint means are in linear alignment and are held in that position against the stay members by the bias force of the buckling springs which are attempting to return to a straight or at least to a less curved condition. It will now be seen that the longeron elements provide strong columnar strength and that the station members provide good lateral strength.

To collapse the device, the station members are held against rotation relative to one another and all of the first joints are moved in the same clockwise or counter-clockwise sense. As shown in FIGS. 2 and 3 looking downwardly, they are moved in the clockwise sense. Under these circumstances, there is a group of rigid triangular structures formed. For example the first stay members remain fully taut. The movement of the longeron elements 29 and 30 will be in the plane of panel 80. This is because there is a rigid right triangle defined by elements 16, 29 and first stay member 90, and rotation of the longeron elements is in a plane normal to the adjacent station element.

All of the first stay members 85, 86 will remain taut as shown in FIG. 2 and all second stay members will become slack. This condition persists in the folded condition shown in FIG. 3 from which most of the stay members have been deleted in order to simplify the drawings for purpose of illustration. Suffice it to say that these right triangles remain fully defined, and only the first one, bounded on one of its sides by stay member 85 is shown in FIG. 3 for purposes of illustration.

It will, however, be noted that the buckling springs have been more acutely bent, and their ends are moved closely together. Thus, the radius of curvature will have been decreased, and the energy it took to cause this change of shape is stored in the buckling spring which exerts a bias force tending to enlarge the radius of curvature and spread the ends farther apart. This situation is shown in FIGS. 4–7. In FIG. 4, the buckling springs are shown in the deployed condition. When in the stored condition it is as schematically shown in FIG. 6. In effect, this shows that the ends of the buckling springs are on the circumscribed circle when the structure is extended, and on the inscribed circle when collapsed. Because the arc length of the buckling spring does not change, it is more acutely bent when stored, thereby exerting a strong expansive force tending to return the structure to its extended condition.

The theory of the right triangles referred to above is shown in FIGS. 5 and 7 which schematically show the side views of the extended and stored device relative to longeron station element and a first stay.

Because the buckling spring remains in compression, it continues to exert its force for extension at all times. For this reason the device must be restrained in its stored condition and can readily be extended simply by releasing the station members, preferably one at a time, and controlling the rate at which the station members are permitted to move apart from one another. Of course when one or more of these structures is provided they may be deployed one at a time.

It will now be seen that this device is an elegantly simple construction which derives its erected structural integrity from the limitation of the stays and by the bias force of the buckling springs to maintain the longeron elements in a condition in which the stays are maintained fully taut.

The device is reliable and will have substantial residual strength even if substantially damaged. For example, destruction of any of the stays will affect only one of the panels. Destruction of any of the first joint means will damage one of the longerons but not the others. Therefore substantial columnar strength will be maintained even in the event of what would ordinarily be considered as a very serious damage.

This invention thereby provides an elegantly simple, reliable and long-lived structure which does not require means to extend it, and which provides substantial strength from minimal structural weight.

This invention is not to be limited by the embodiments shown in the drawings and described in the description which are given by way of example and not of limitation, but only in accordance with the scope of the appended claims.

I claim:

1. An extendible structure having an axis of extension, said structure comprising:

a plurality of axially spaced-apart station members, each said station member being rigid, and lying in a plane normal to said axis;

at least three longeron members, each said longeron member comprising a pair of rigid longeron elements, first joint means joining first ends of the elements of each pair of longeron elements to one another for foldable movement relative to each other, and second joint means joining second ends of said longeron elements to respective station members for foldable movement relative to said station member;

a buckling spring which buckles resiliently and arcuately as an Euler column under end load compression, connected to and between each pair of adjacent first joint means whereby to bias said first joint means away from each other, with a resultant force on each first joint means directed outwardly away from said axis, said station members and adjacent longeron members, when all joint means respective to each pair of joined longeron elements are aligned, forming a respective side panel; and a pair of first stay members, and a pair of second stay members for each said panel, all of said stay members having a maximum length when fully stretched by tension forces, each one of each pair of said first stay members extending from its respective first joint means of one longeron member to a respective second joint means of the adjacent longeron member of that panel, converging in the direction of fold of said longeron elements, each one of each pair of said second stay members extending from a respective second joint means of said adjacent longeron member to the first joint means of the first-mentioned longeron member, at least said second stay members being non-rigid with respect to endwise compressive forces.

2. Apparatus according to claim 1 in which all of said second joint means are hinges with one degree of freedom.

3. Apparatus according to claim 1 in which said longeron elements are rod-like.

4. Apparatus according to claim 1 in which said station members are comprised of rod-like members joined to form a rigid polygon, and in which said second joint means are attached to said station members at respective apices of said polygon.

5. Apparatus according to claim 1 in which said second stay members are flexible and substantially inelastic.

6. Apparatus according to claim 1 in which said bucklings springs comprise strap-like members which inherently tend to return toward a condition of greater distance between their ends.

7. Apparatus according to claim 6 in which said bucklings springs are buckled in compression when said structure is fully extended.

8. Apparatus according to claim 1 in which all joint means have at least one degree of rotational freedom.

9. Apparatus according to claim 8 in which some joint means have at least two degrees of rotational freedom.

10. Apparatus according to claim 1 in which a plurality of said structures are joined to form a longer structure by joining longeron members to the other side of one of said station members, and another station member to said last-named longeron elements, together with like joint means, stay members and buckling springs, whereby to form a second said structure as a continuation of said first-named structure, the adjacent structures sharing a station element.

11. Apparatus according to claim 10 in which further additional said structures are added by similar addition of like structure.

12. Apparatus according to claim 1 in which a plurality of said structures are joined to form a wider structure joining an additional station member to each said station member in its said plane.

13. Apparatus according to claim 12 in which further additional said structures are added by similar addition of like structure.

14. Apparatus according to claim 1 in which all stay members are flexible and substantially inelastic.

15. Apparatus according to claim 14 in which said buckling springs comprise strap-like members which inherently tend to return toward a condition of greater distance between their ends.

16. Apparatus according to claim 1 in which said second joint means lie at the apices of a rectangular quadrilateral panel.

17. Apparatus according to claim 16 in which said second stay members are flexible.

18. Apparatus according to claim 17 in which said first stay members are rigid.

19. Apparatus according to claim 17 in which said first stay members are flexible.

20. Apparatus according to claim 1 in which said second joint means lie at the apices of a polygon defining the station members.

21. Apparatus according to claim 20 in which said polygon is a rectangular quadrilateral.

22. Apparatus according to claim 20 in which said polygon is a regular polygon.

23. Apparatus according to claim 22 in which said quadrilateral is equilateral.

24. Apparatus according to claim 20 in which said polygon is a triangle.

25. Apparatus according to claim 24 in which said triangle is equilateral.

* * * * *